UNITED STATES PATENT OFFICE.

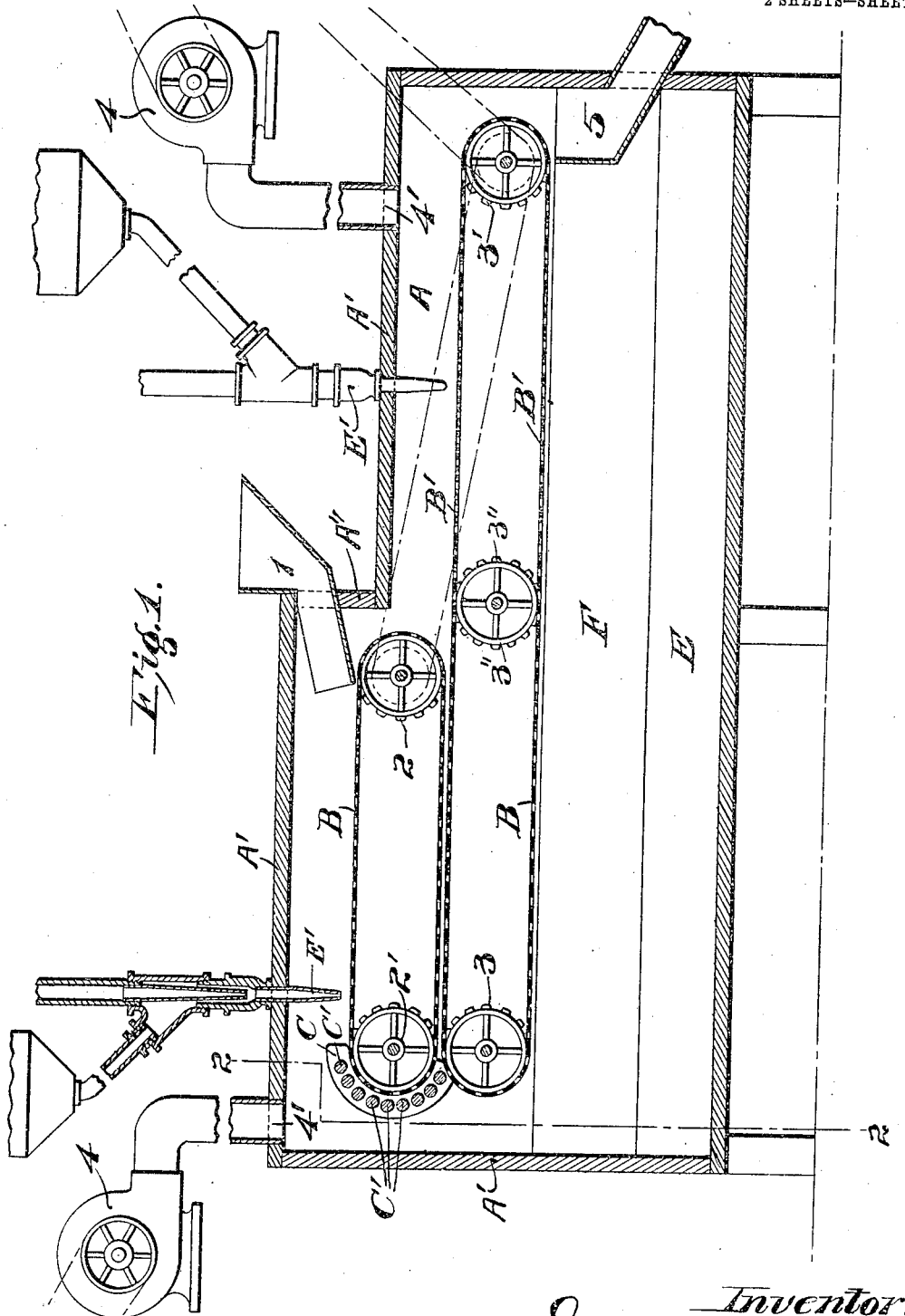

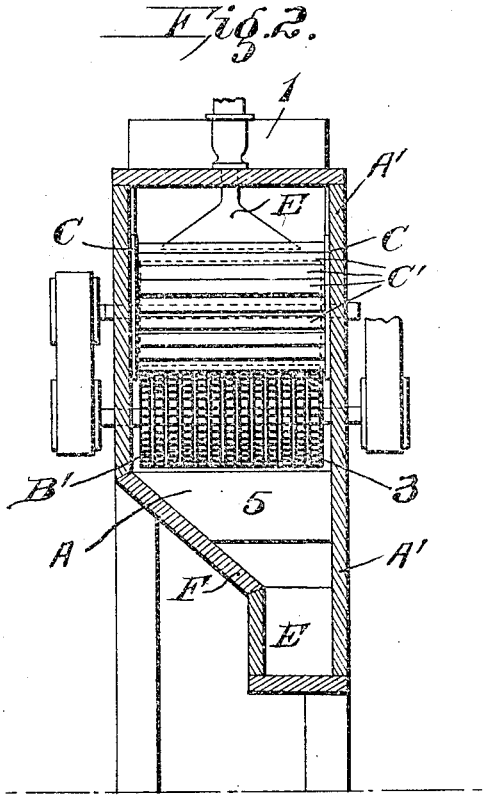
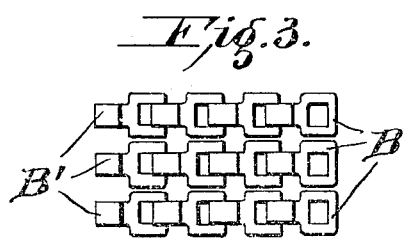
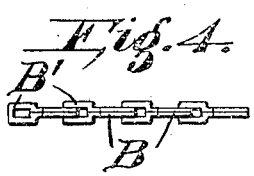

EDWARD JOHN O'BRIEN, OF ST. LOUIS, MISSOURI.

COTTON-SEED-DELINTING MACHINE.

No. 927,586.  Specification of Letters Patent.  Patented July 13, 1909.

Application filed December 28, 1908. Serial No. 469,729.

*To all whom it may concern:*

Be it known that I, EDWARD JOHN O'BRIEN, a citizen of the United States, residing at the city of St. Louis, in the State of Missouri, have invented a new and useful Cotton-Seed-Delinting Machine, of which the following is a specification.

My invention relates to improvements in machines employed for removing the lint from cotton seeds and has special reference to the art as disclosed in the application for a patent heretofore filed by me of date November 30th, 1908, Serial Number 465,596, wherein is shown a means of delinting cotton seeds by introducing to the art the use of a sand blast in a seed containing chamber, whereby the cotton seed is made clear of any lint that may be on it before it is subjected to the abrading action of the sand blast in a vortex chamber; the cottonseed being oleaginous and thereby containing in itself a natural characteristic to turn, or reject, the sharp edges of the impelled sand blast after the latter has cut off from the surface or hull of the seed the lint whereof it had been clothed, thus serves to protect the seed from injury if it is exposed to the blast after having been delinted; the object of my invention herein being to provide a means and mechanism whereby the removal of all of the lint from the cotton-seed may be achieved by the application of a direct and positive action of the sand blast upon the undelinted seed, first, by removing it in one comparative hemisphere thereof, and afterward upon the other, whereby the seed is wholly and positively delinted by a current of mixed sand and air under compression applied thereto, first on one side and then upon the other.

With the object thus stated in view, my invention consists in certain novel features of construction and arrangements of parts and mode of operation which is hereinafter more fully pointed out and described and also referred to in the claims hereof.

In the accompanying drawings, Figure I is a vertical cross-section of my improved machine; Fig. II a cross-section thereof upon the lines 2, 2, Fig. I; Fig. III, a sectional view of the open chain belting or carrier, and Fig. IV, a detail of the same.

Similar letters and figures refer to similar parts throughout the several views.

The frame, or body, of the machine as shown consists of a casing, A, the top of which being formed by two platforms, A', A', one of which is a step down from the other and having openings for one or more sand blast nozzles, E', E'; for the purpose of conducting expended sand into the sand box, E, one of the front sides, F, of the body is made to slant inwardly. The step, A'', of the top, A', A', is provided with an opening through which the seed is fed to the upper chain or screen belt, B, through a feed or hopper, 1; if desired, a top to retain seed just prior to being put into the machine may be added to the feed hopper, 1, and with a hand or fixed roll to smooth and felt the seed together as it passes into the machine 2, 2', are transverse reels or rollers made from wood, metal or other suitable material and designed to revolve and carry the chain or screen carrier belt, B, upon which the seed is first acted upon when it enters the machine; these reels are provided on both sides of the body of the machine with journals for hand or belt turning power as desired. 3, 3', are similar reels or carrying rolls to those marked 2, 2', except they are placed nearly twice the distance apart that the former are placed, and serve to hold move and carry the seed after it has left the upper chain or screen carrier belt, B, upon that one marked B'; C, is a frame semi-annular in outline and following in general contour the end of the chain belt as it passes around the end of the reel 2' but removed sufficiently therefrom to allow the partly delinted seed that has been exposed to the action of the sand blast upon the carrier or belt, B, to pass securely between it and the faces of the idling rolls, C', C'', running in the segmental frame, C; it is apparent that other resources are known and available to hold and operate the idling rollers, C', C', in the turning of the seed, but the above I conceive is the preferred way, and in this manner the seed, the tops of which have been delinted by the sand blast are delivered in a reversed position upon the chain belt carrier, B', and thus the part of such seed as was undelinted at the first exposure to the blast is removed upon the second or lower carrier belt, B'; meantime the expended sand passes freely through the interstices of the chain or belt screen carrier to the sand box, E, and the lint matter removed and cleaned off of the seed by the mechanism shown is drawn off from the machine by means of the exhaust ducts, 4', 4', and the cleaned seed is discharged from the machine by the duct, 5, located at the end of the body of the machine; E', E', are nozzles leading from a sand blast apparatus, not shown, and afford the necessary sand to clean and delint in a thorough manner cotton seed that may require such delinting; 3″ is a reel or idling roll placed between the end rolls, 3, 3′, of the lower belt carrier, B, and is used to take up the slack or sag thereof.

The operation is substantially as follows, to wit: The seed to be delinted is placed into the hopper approximately smoothly and one seed deep, spreading across the inner width of the machine; from thence it is passed on the open carrier belting, B, under the action of a sand blast nozzle, which removes the lint therefrom; these seeds moving continuously are led between the end idlers, C′, C′, and is by them retained and delivered upon the lower carrier belt, B′, in a reversed position from that occupied on the upper carrier; passing under the upper rolls and carrier, they are then again exposed to the action of the sand blast, but this time the seed is exposed upon its other hemisphere, or that which had not been previously subjected to abrasion and thus thoroughly delinted, leaving the seed perfectly clean of lint, so as to afford the best of conditions for handling, storing, crushing and the various other requirements desired by the trade.

Having thus described my invention, what I claim as new and desire to secure by Letters Patent is:

1. In a cotton seed delinting machine, the combination of sand blast means for delinting cotton seed, means for carrying the seed beneath said delinting means, and suction means for removing the lint from the machine, all substantially as and for the purpose specified.

2. In a cotton seed delinting machine, the combination of sand blast means for delinting cotton seed, means for carrying the seed beneath said delinting means and suction means for removing the lint from the machine together with means for carrying off from the machine the delinted seed, all substantially as and for the purposes set forth.

3. In a cotton seed delinting machine, the combination of sand blast means for delinting cotton seed, means for carrying the seed beneath said delinting means and suction means for removing the lint from the machine together with means for carrying off from the machine the delinted seed, and means for receiving the used sand, all substantially as and for the purposes specified.

EDWARD JOHN O'BRIEN.

In presence of—
  A. R. RUSSELL,
  THEODOSIA MATTHEWS.